United States Patent [19]

Brodeur et al.

[11] E Patent Number: Re. 33,207

[45] Reissued Date of Patent: May 1, 1990

[54] BRAKE SYSTEM

[75] Inventors: Rene H. Brodeur, Punta Gorda, Fla.; Boris S. Terlecky, Woodridge; Gerald R. Misner, Peotone, both of Ill.

[73] Assignee: Trailer Train Company, Chicago, Ill.

[21] Appl. No.: 122,701

[22] Filed: Nov. 19, 1987

Related U.S. Patent Documents

Reissue of:

[64] Patent No.: 4,596,311
Issued: Jun. 24, 1986
Appl. No.: 653,831
Filed: Sep. 24, 1984

[51] Int. Cl.[5] ..... F16D 66/00; F16D 65/14; F16D 65/52

[52] U.S. Cl. ..... 188/1.11; 188/107; 188/153 D; 188/198; 188/216

[58] Field of Search ..... 188/197–203, 188/196, 1.11, 214–215, 74–76, 26, 28, 48, 56, 58–59, 107, 106 F, 106 P, 366, 153 A, 153 D, 153 R, 216, 79.5, 79.51–79.64

[56] References Cited

U.S. PATENT DOCUMENTS

| | | | |
|---|---|---|---|
| 136,781 | 3/1873 | Smith | 188/153 D |
| 246,166 | 8/1881 | Lorraine | 188/153 D |
| 598,766 | 2/1898 | Campany | 188/153 D |
| 696,114 | 3/1902 | Stevens | 188/153 D |
| 3,454,140 | 7/1969 | Billeter | 188/202 |
| 3,595,347 | 7/1971 | Billeter | 188/202 |
| 3,602,343 | 8/1971 | Billeter | 188/202 |
| 3,669,224 | 6/1972 | Billeter | 188/202 |
| 4,345,672 | 8/1982 | Nakasu | 188/1.11 |
| 4,596,311 | 6/1986 | Brodeur et al. | 188/153 D X |

*Primary Examiner*—Douglas C. Butler
*Attorney, Agent, or Firm*—Kinzer, Plyer, Dorn, McEachran & Jambor

[57] ABSTRACT

A railroad car brake system operable by an air bag which includes double acting brakes operable on the wheels. Links suspend the brakes and the live and dead levers connected by an adjustable connecting link mechanism are operable by the air bag. Slack as a result of wear in the brakes is automatically taken up.

22 Claims, 4 Drawing Sheets

BRAKE SYSTEM

Matter enclosed in heavy brackets [ ] appears in the original patent but forms no part of this reissue specification; matter printed in italics indicates the additions made by reissue.

*This is a reissue of U.S. Pat. No. 4,596,311, issued Jun. 24, 1986.*

BACKGROUND OF THE INVENTION

This invention relates to railroad cars, and more particularly, to an improved brake system therefor, particularly cars employing single axle trucks.

Conventional railroad cars include a car body supported for movement over a pair of rails by one or more wheel trucks. A brake system is normally provided including brake shoes operable to frictionally engage the wheels and slow or stop the car.

Many railroad car brake systems include a cylinder and piston for actuating the brake shoes into frictional engagement with the wheels. The conventional cylinder and piston employed is a cast iron construction which is relatvely heavy and cumbersome. On modern, fuel efficient cars, weight is a major concern. Elimination of excess weight through use of single axle trucks is a clear advantage. Reduction of weight in the brake system, therefore, is a distinct improvement.

Many conventional brake systems are "single acting", i.e., employ only one brake shoe engaging each wheel and require the, relatively heavy cast iron cylinder and piston construction. Attempts have been made to reduce the required brake application force by utilizing "double acting" systems where opposed brake shoes sandwich or clamp the wheels between them. This is particularly true in single axle wheel trucks which have only two wheels. One of the problems here has been that slack develops as the brake shoes wear causing the parts to undergo increased travel during brake application. Slack take-up in double acting systems has been difficult to achieve.

The present invention is directed to a brake system for railroad cars which minimize weight through elimination of the normal cast iron piston and cylinder and yet is efficient and can be utilized with single axle wheel trucks. It is constructed to automatically adjust for wear of the brake shoes and provides for a relatively constant brake application force throughout the life of the brake shoes.

SUMMARY OF THE INVENTION

The present invention encompasses a brake system for a railroad car of the type which includes first and second brake riggings extending across the wheel truck at opposite edges of the wheel flanges provided with brake shoes at each end for engaging opposite flange faces. First and second linkage means pivotally connected to the car body and to respective ones of the riggings are operable to move the brake shoes toward and away from the wheels. An expandable air bag on the car is connected to the first linkage means to activate the system. Connecting link means pivotally connects the first and second linkage means, whereby movement of the first linkage means in one direction upon actuation of the air bag causes the brake shoes to clamp against opposite flange faces of the wheels, and movement of the first linkage means in the opposite direction upon contraction of the air bag causes the brake shoes to release from the wheels. The system includes means for automatically adjusting the length of the connecting link means to take up slack as a result of wear of the brake shoes.

Broadly, the first linkage means includes a hanger link means pivotally connected to the car body and to the first rigging, and a live lever pivotally connected to the first brake rigging and the connecting link means causing the first and second brake riggings to cooperate. The second linkage means includes a dead lever pivotally connected to the car body and second rigging and to the connecting link means. The connecting link means is an adjustable link and is operable in response to relative positioning of the first hanger link and the live lever when the brake shoes are clamped against the wheels to adjust the length of the adjustable connecting link means, and thereby take up wear in the brake shoes.

The air bag preferably is connected to the live lever, and the adjustable connecting link is connected to the live lever intermediate the air bag and the connection of the live lever to the hanger link means and first brake rigging. Hand brake means is connected to the live lever to operate the brake shoes independently of the air bag.

DETAILED DESCRIPTION

Figure 1:
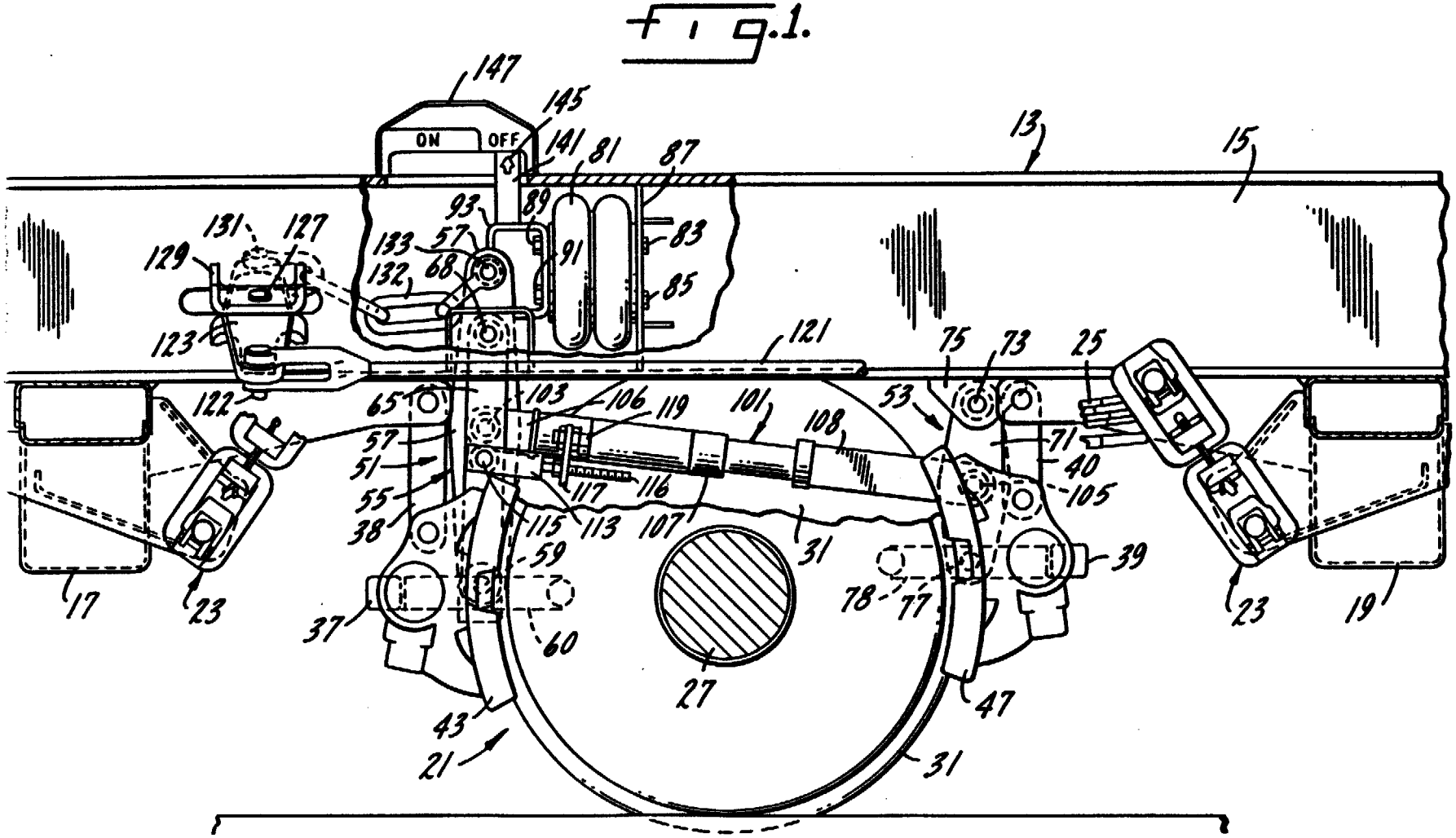
FIG. 1 is a side elevational view, partly in section, taken along the line 1—1 in FIG. 2, and illustrating a portion of the railroad car and a single axle wheel truck embodying a brake system constructed in accordance with the present invention.

Referring now to the drawings, a railroad car embodying the present invention is illustrated and is seen to include a car body 13 which includes a centersill 15 and a plurality of cross beams 17, 19 joined together. The car body 13 is supported by a wheel truck 21 through a plurality of swing hangers 23 which are fixed to the body 13 (FIG. 2) and truck springs 25 which are fixed at their end to the hangers 23 and at their midpoint to a bearing box 26 (FIG. 2) on the wheel truck 21.

The wheel trucks illustrated include one axle having a wheel disposed at opposite ends thereof at each side of the car body. The invention finds particular use, in such single axle trucks but is applicable to multiple axle trucks as well. Wheel trucks 21 include a single axle 27 shown with one end supported in the bearing box 26 (FIG. 2) and having a pair of wheels 31 (only one of which is shown) disposed at opposite ends thereof. It will be understood that the wheel truck construction at the opposite side of the car 13 and the connecting structure between the truck and the car 13 is substantially identical to that illustrated in the drawings and described above.

In accordance with the invention, a brake system for railroad car comprises first and second brake riggings extending across the wheel trucks at opposite ends of the wheels and provided with brake shoes for engaging opposite ends of the wheels. As embodied herein, first and second brake riggings 33, 35 extend across the wheel truck 21 at opposite ends of the wheels 31 (FIG.

2). The brake riggings 33,35 include brake beams 37,39, pivotally suspended at their ends from the car body 13 by rigging hangers 38,40 (See also FIG. 1). The beam 37 carries a pair of brake shoes 43 (only one of which is shown) for engaging the other edge or flange of wheels 31, respectively. Again, it will be understood that the portion of the beams 37,39 omitted from the drawings and the omitted brake shoes are substantially identical to that shown and the brake shoes (not shown) are positioned to engage the wheel at the other side the car 13 in the same manner as that shown.

Figure 5:
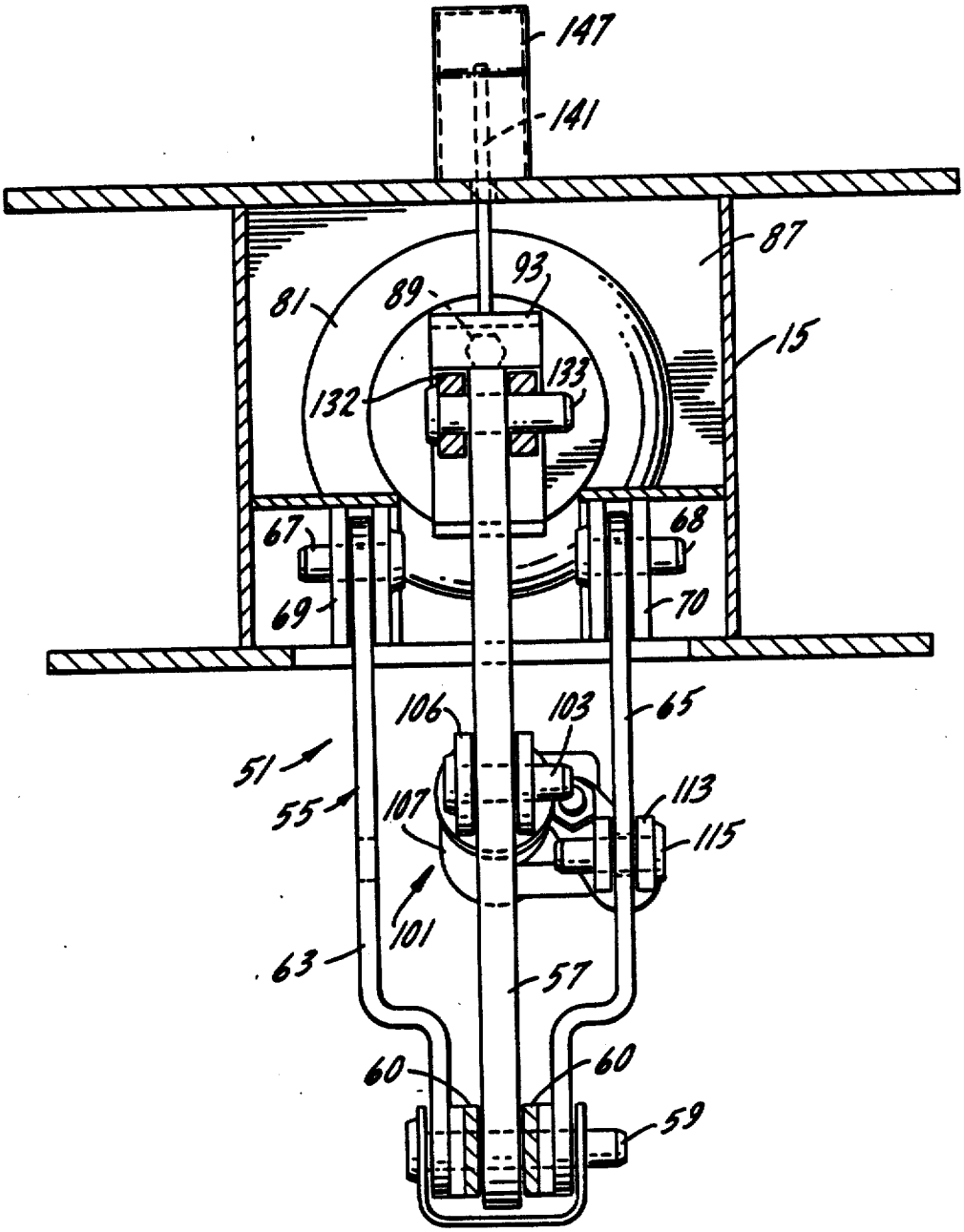
FIG. 5 is an enlarged sectional view of the structure of FIG. 2 taken along the line 5—5 thereof.

In accordance with the invention, first and second linkage means are pivotally connected to the car body and to respective ones of the riggings and are operable to move the brake shoes toward and away from the wheels. As embodied herein, a first linkage means generally illustrated at 51 in FIG. 1 includes hanger link means 55 made up of a pair of spaced hanger links 63,65 which are pivotally connected at their lower ends by a pin 59 to a brace 60 which spans an intermediate part of the brake beam 37. (See also FIGS. 3 and 5). The first linkage means 51 further includes a live lever 57 positioned between the hanger links 63,65 and also pivoted thereto and to the beam 37 by the pin 59. The upper ends of the hanger links 63,65 are pivoted by pins 67,68 to hanger supports 69,70 which are fixed to the centersill 15.

Figure 3:
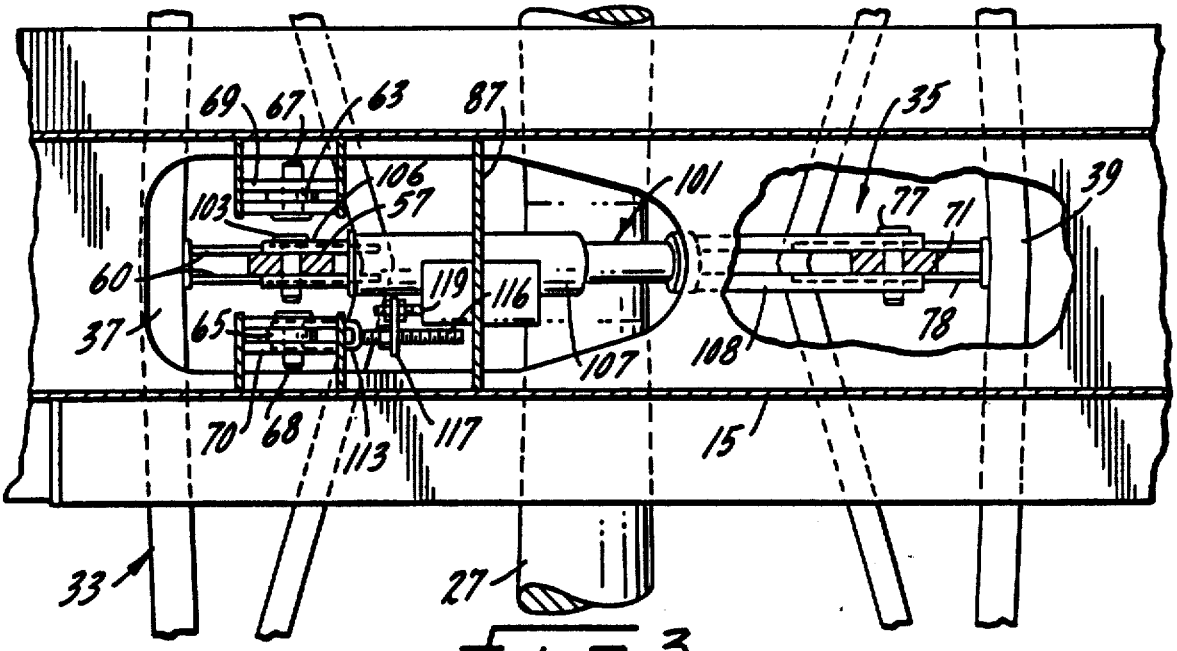
FIG. 3 is a view of a portion of FIG. 2 with parts broken away for clarity.
Figure 4:
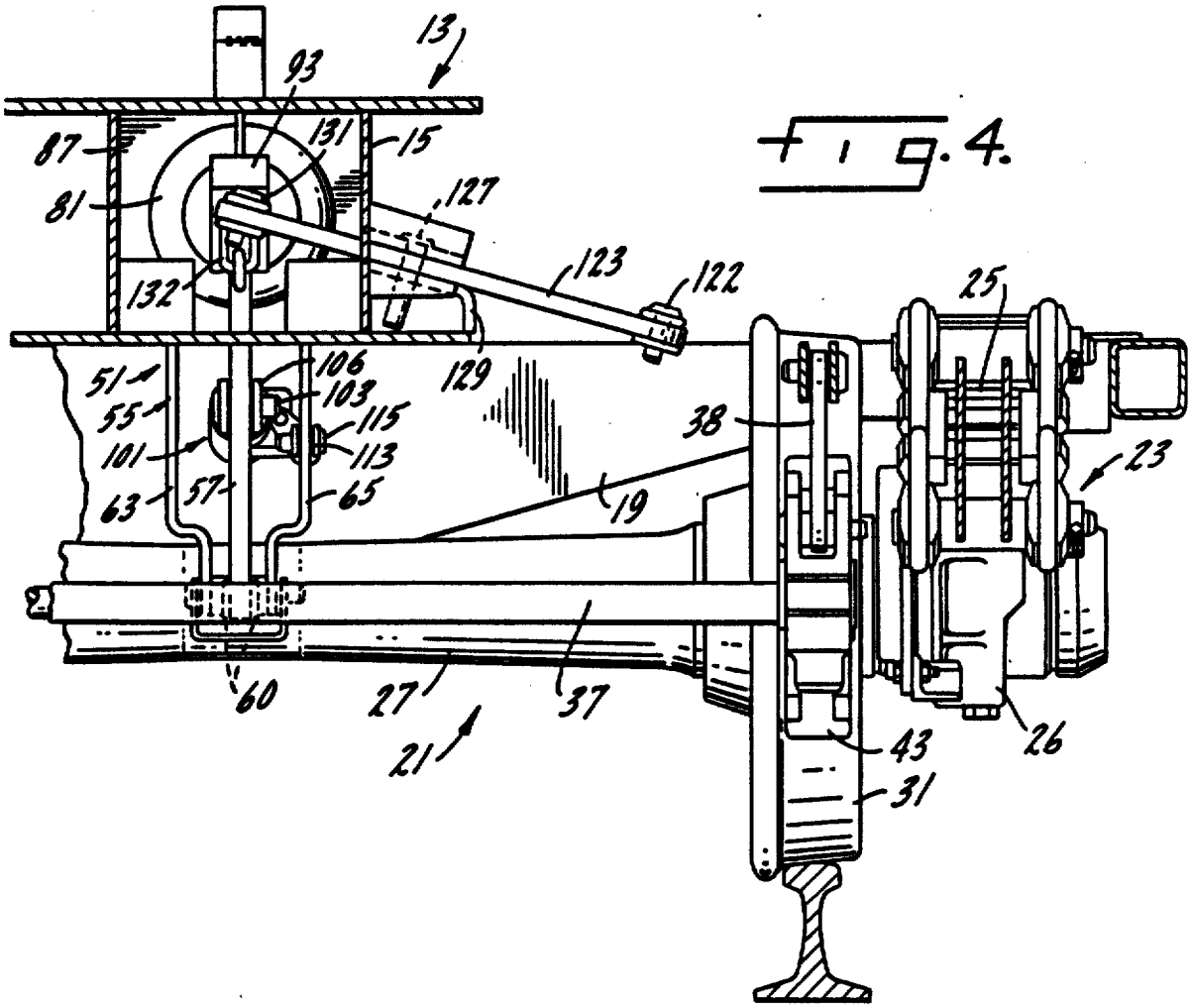
FIG. 4 is an end view of FIG. 1.

As further embodied herein, second linkage means illustrated generally at 53 includes a dead lever 71 which is pivoted at its upper end by a pin 73 to a bracket 75 fixed to the centersill 15 and at its lower end by a pin 77 to a brace 78 which spans an intermediate part of the brake beam 39 (see FIG. 3). In a manner described below, the first and second linkage means 51,53 are operable to move the brake shoes 43, 47 toward and away from the wheels 31.

In accordance with the invention, an expandable air bag on the car body is connected to the first linkage means, and connecting link means 101 pivotally connects the first and second linkage means, whereby movement of the first linkage means in one direction upon expansion of the air bag causes the brake shoes to clamp against opposite faces of the wheels, and movement of the first linkage means in the opposite direction upon contraction of the air bag causes the brake shoes to release from the wheels.

As embodied herein, an air bag 81 which includes an expandable bellows construction, is secured at one end, by bolts 83,85 to a plate 87 fixed to the centersill 15. The other end of the air bag 81 is fixed by bolts 89,91 to a bracket 93 which is secured as by welding to the upper end of live lever 57. The air bag 81 is adapted for connection to the compressed air system of the train (not shown) of which the car 13 is a part by an air hose (not shown). It will be understood by those skilled in the art that suitable controls will provide a means by which the compressed air supply of the train may be used to expand and contract the air bag 81 at will. Thus, when compressed air is admitted to the air bag 81, it expands causing the bracket 93 to move toward the left, as seen in FIG. 1. When air is exhausted from the air bag 81, it contracts to its normal shape and the bracket 93 moves in a right-hand direction as seen in the figure.

The air bag 81 may be constructed as are those which are commercially available for use as air springs in tractor-trailers. Air bag construction is considerably lighter in weight, and particularly suitable for fuel efficient railway cars. An example of a suitable air bag is a Firestone AIRSTROKE (Registered Trademark of Firestone Tire and Rubber Company), No. 20, air mount, obtainable from Firestone Industrial Co., Noblesville, In. 45060. Such an air bag has been incorporated into a brake system embodying the present invention. The air bag had a minimum, unpressurized height of 4.1 inches and an applied height, i.e., height when brakes are applied, of $6\frac{1}{4}$ inches. With the air bag charged at 50 pounds per square inch (gauge), the net force output of the air bag at the applied height was 1900 pounds.

As further embodied herein and shown in FIG. 1, connecting link means 101 is pivotally connected at one end by a pin 103 to live lever 57 of first linkage means 51 and by a pin 105 to dead lever 71 of second linkage means 53. The connecting link means 101 provides a rigid connection between the first and second linkage means 51,53 so that when pressurized, air causes the air bag 81 to expand and the bracket 93 to move toward the left, as seen in FIG. 1, live lever 57 moves in the same direction, and through the connecting link means 101, causes the dead lever 71 to swing in a clockwise direction about pin 73. The results is to place connecting link means 101 in tension to press each pair of brake shoes 43,47 against opposite flange faces of wheels 31 at each side of the car. Thus, each set of brake shoes 43,47 are "double acting" on their respective wheels.

When air pressure to the air bag 81 is released, the air bag 81 returns to its normal shape and the brake shoes 43,47 are released from wheels 31. FIG. 1 shows the bag 81 expanded and the brakes engaged.

In accordance with the invention connecting link means 101 is adjustable in length dependent on brake shoe wear. It is "double acting" in that it automatically changes its rigid length to become longer or shorter depending upon the condition of the brake shoes as will be understood herein. Connecting link means 101 is a double acting slack adjuster. A suitable slack adjuster is manufactured by Ellcon-National of Totowa, N.J. Model 9100 D.J. Another suitable slack adjuster is Model 5002-DJS, marketed by Sloan Valve Company, Chicago, Ill. Examples of "double acting" slack adjusters are found, for example, in United States Patents issue to H. R. Billeter and assigned to Sloan Valve Company, Chicago, Ill. Such examples are U.S. Pat. Nos. 3,454,140, issued Jul. 8, 1969; 3,595,347, issued July 27, 1971; 3,602,434, issued Aug. 31, 1971, and 3,669,224, issued Jun. 13, 1972.

An adjustment actuator or trigger is connected to the hanger link means and to the adjustable connecting link means 101. The trigger senses changes in the relative angular position of the live lever 57 and the hanger link means 55 which results from increased or decreased pivotal movements of the live lever and hanger link means depending upon brake shoe condition. The trigger is operable in response to this relative positioning to cause the connecting link means 101 to make a corresponding change in its rigid length.

As embodied herein and shown in FIG. 1, the adjustable connecting link means 101 includes first and second moveable yokes 106,108, which extend into barrel 107. Yoke 106 is interconnected with a clutch and spring (not shown), and yoke 108 is connected to an adjusting screw and clutch (not shown). Adjustment actuator or trigger 113 is connected at one end by a pin 115 to one of the hanger links 65 and has a projecting rod 116 at its other end extending through a bracket 117 fixed to a pull rod 119. The parts are interconnected in a manner so that when the brakes are applied, as described above, a sufficient amount of movement of the live lever relative to the hanger link means causes the trigger to activate internal mechanisms and shorten or lengthen the rigid length of connector link 101.

Thus, when pressurized air is delivered to the air bag 81 causing the bracket 93 to move in a left-hand direction, as seen in FIG. 1, the live lever 57 pivots in a counterclockwise direction, until the brake shoes 43,47 clamp against the wheel 31. The extent of this movement is a function of the wear on the brake shoes 43,47 and, when a sufficient amount of movement occurs, representative of the wear of the brake shoes, the pull rod 119 moves sufficiently and, through the adjusting screw (not shown) shortens the length of the link 101. This automatically takes up slack which occurs as a result of wear in the brake shoes. As can be appreciated, since the slack adjuster is double acting, it is effective to shorten the rigid length of connecting link means 101 when worn brake shoes are replaced. Such replacement removes slack from the system and requires the slack adjuster to reestablish its original length for new shoes.

In accordance with another feature of the invention, hand brake means is provided which is operable to apply the brakes to the wheels independently of the air bag. The hand brake means is connected to the first linkage means. In addition, an indicator is provided to indicate whether the brake shoes are clamped against the wheels or are released.

Figure 2:
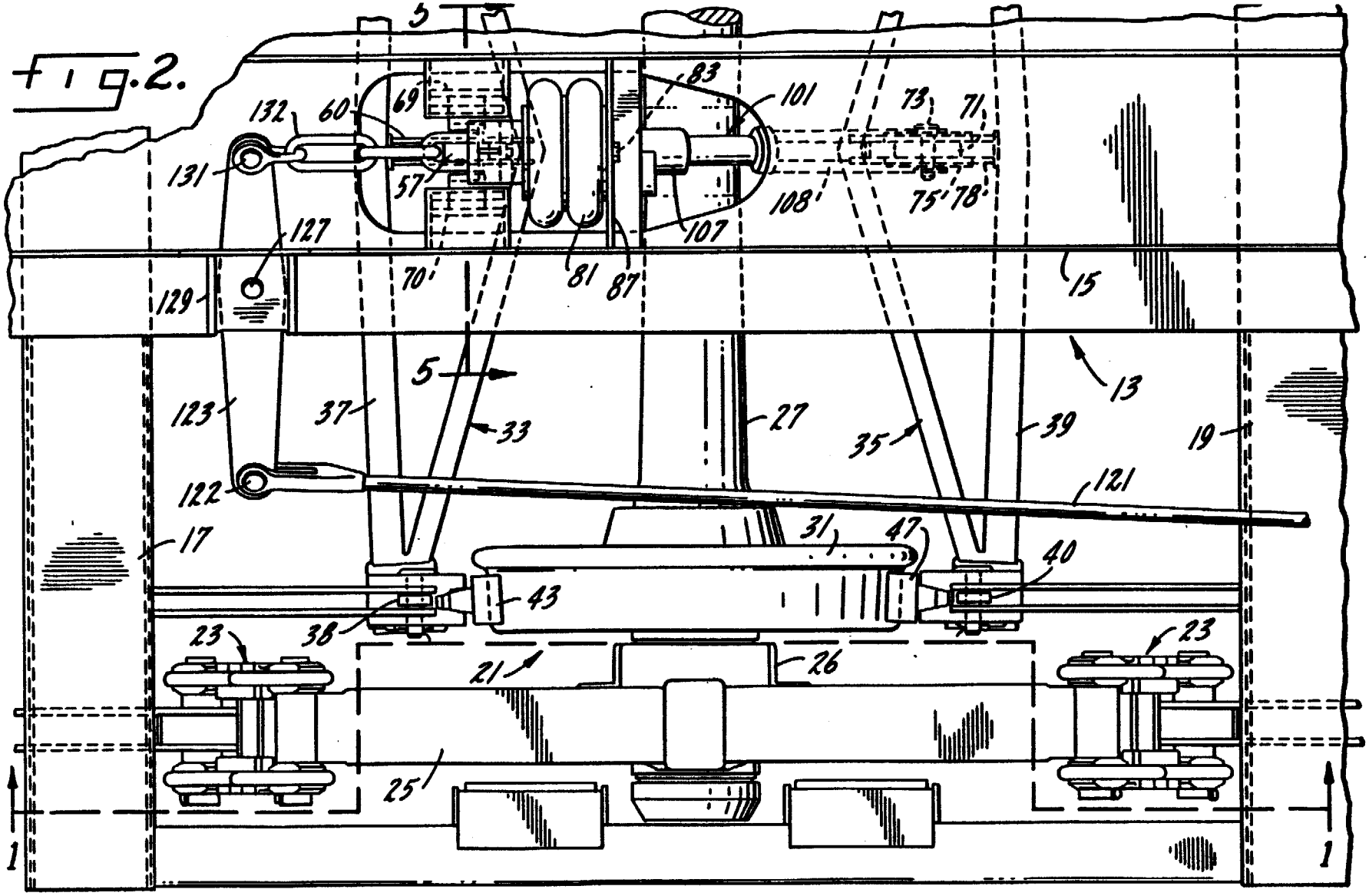
FIG. 2 is a top plan view of the structure of FIG. 1.

As embodied herein, a hand brake rod 121 is pivoted at one end by a pin 122 to an actuator lever 123 which is also pivoted by a pin 127 to a bracket 129 fixed to the centersill 15. (See FIGS. 1 and 2). The other end of the lever 123 is pivoted by a pin 131 to a chain 132 which is connected to a pin 133 on the live link 57. The other end of the rod 121 is connected to a hand brake wheel (not shown) which may be manually operated to move the rod 121 longitudinally, as seen in FIGS. 1 and 2. When the rod 121 is moved in a right-handed direction, the chain 132 pulls the live link 57 toward the left. This causes the brake shoes 43,47 to be applied against the wheels 31 in substantially the same manner as described above but independently of the air bag 81. Movement of the hand brake rod 121 in a left-hand direction as seen in FIGS. 1 and 2 causes the brakes to be released. Chain 131 permits the air bag 81 and bracket 93 to operate live link 57 independently of the hand brake.

As further embodied herein, the live link 57 has an indicator 141 extending upwardly through an opening in the top of the centersill 15. The indicator 141 has a pointer 145 adapted to register with and on/off register 147. In this manner, it may be visually perceived whether the hand brake has been applied to actuate the brakes into engagement with the wheels.

By the foregoing, there has been disclosed a brake system for a railroad car which provides the inventive concepts set forth herein. It will be understood that various additions, substitutions, modifications and omissions may be made to the present invention without departing from the scope or spirit of the invention as encompassed by the appended claims. Therefore, it is to be understood that the present invention encompasses those additions, substitutions, modifications and omissions provided they come within the scope of the appended claims and their equivalents.

What is claimed is:

1. A brake system for a railroad car including a car body supported by a wheel truck having at least one pair of wheels connected by an axle, said system comprising first and second brake riggings extending across said wheel truck at opposite edges of said wheels and provided with brake shoes at each end for engaging said wheels, first and second linkage means operable to move said brake shoes toward and away from said wheels, said first linkage means including a live lever pivotally connected at one end to one of said brake riggings, an expandable air bag secured to said car body and connected to said live lever at its opposite end, said second linkage means including a dead lever pivotally connected at one end to said car body and at its opposite end to the other of said brake riggings, connecting link means pivotally connected at one end to said live lever intermediate the connection of said live lever to said one of said brake riggings and said air bag, and at an opposite end to said dead lever intermediate the connection of said dead lever to said car body and the other of said brake riggings, expansion of said air bag causing siad first and second linkage means to move said brake shoes toward said wheels, contraction of said air bag causing said first and second linkage means to move said brake shoes away from said wheels.

2. The brake means system claimed in claim 1, wherein said connecting link means is an adjustable link adapted for automatically adjusting its length to take up slack as a result of wear of said brake shoes.

3. The brake system as claimed in claim 2 wherein said connecting link means comprises a double acting slack adjuster.

4. The brake system claimed in claim 1, said first linkage means including hanger link means pivotally connected to said car body and to said live lever at said pivotal connection to said first brake rigging.

5. The brake system claimed in claim 4, wherein said connecting linkage means is an adjustable link adapted for automatically adjusting its length to take up slack as a result of wear of said brake shoes.

6. The brake system as claimed in claim 5, wherein said connecting link means comprises a double acting slack adjuster.

7. The brake system claimed in claim 6 including an actuator connected to said hanger link means and said connecting link means, operable in response to relative positions of said hanger link means and said live lever to adjust the length of said connecting link means.

8. The brake system claimed in claim 5, including hand brake means connected to said live lever for manually moving said brake shoes to clamp against said wheels and to release therefrom independently of actuation of said air bag.

9. The brake system claimed in claim 4, including an actuator connected to said hanger link means and said connecting link means, operable in response to relative positions of said hanger link means and said live lever to adjust the length of said connecting link means.

10. The brake system claimed in claim 1, including hand brake means connected to said first linkage means and manually operable to cause said brake shoes to clamp against said wheels and to release therefrom.

11. The brake system claimed in claim 10, including indicator means operable to indicate whether said brake shoes are clamped against said wheels or released therefrom.

*12. A brake system for a railroad car including a car body supported by a wheel truck having at least one pair of wheels connected by an axle, said system comprising first and second brake riggings extended across said wheel truck at opposite edges of said wheels and provided with brake*

*shoes at each end for engaging said wheels, first and second linkage means operable to move said brake shoes toward and away from said wheels, said first linkage means including a live lever pivotally connected at one end to one of said brake riggings, an expandable actuator means secured to said car body and connected to said live lever at its opposite end, said second linkage means including a dead lever pivotally connected at one end to said car body and at its opposite end to the other of said brake riggings, connecting link means pivotally connected at one end to said live lever intermediate the connection of said live lever to said one of said brake riggings and said actuator means, and at an opposite end to said dead lever intermediate the connection of said dead lever to said car body and the other of said brake riggings, expansion of said actuator means causing said first and second linkage means to move said brake shoes toward said wheels, contraction of said actuator means causing said first and second linkage means to move said brake shoes away from said wheels.*

*13. The brake means system claimed in claim 12, wherein said connecting link means is an adjustable link adapted for automatically adjusting its length to take up slack as a result of wear of said brake shoes.*

*14. The brake system as claimed in claim 13 wherein said connecting link means comprises a double acting slack adjuster.*

*15. The brake system claimed in claim 12, said first linkage means including hanger link means pivotally connected to said car body and to said live lever at said pivotal connection to said first brake rigging.*

*16. The brake system claimed in claim 15, wherein said connecting linkage means is an adjustable link adapted for automatically adjusting its length to take up slack as a result of wear of said brake shoes.*

*17. The brake system as claimed in claim 16, wherein said connecting link means comprises a double acting slack adjuster.*

*18. The brake system claimed in claim 17, including an actuator connected to said hanger link means and said connecting link means, operable in response to relative positions of said hanger link means and said live lever to adjust the length of said connecting link means.*

*19. The brake system claimed in claim 16, including hand brake means connected to said live lever for manually moving said brake shoes to clamp against said wheels and to release therefrom independently of actuation of said actuator means.*

*20. The brake system claimed in claim 15, including an actuator connected to said hanger link means and said connecting link means, operable in response to relative positions of said hanger link means and said live lever to adjust the length of said connecting link means.*

*21. The brake system claimed in claim 12, including hand brake means connected to said first linkage means and manually operable to cause said brake shoes to clamp against said wheels and to release therefrom.*

*22. The brake system claimed in claim 21, including indicator means operable to indicate whether said brake shoes are clamped against said wheels or released therefrom.*

* * * * *